US005450872A

United States Patent [19]

Pacht

[11] Patent Number: 5,450,872

[45] Date of Patent: Sep. 19, 1995

[54] CONSTANT PRESSURE VALVE AND METHOD

[75] Inventor: Amos Pacht, Houston, Tex.

[73] Assignee: Butterworth Jetting Systems, Inc., Houston, Tex.

[21] Appl. No.: 298,879

[22] Filed: Sep. 1, 1994

Related U.S. Application Data

[62] Division of Ser. No. 47,962, Apr. 15, 1993, Pat. No. 5,398,715.

[51] Int. Cl.[6] .................... F16K 21/00

[52] U.S. Cl. .................... 137/110; 239/76; 251/223; 251/297

[58] Field of Search .................... 137/110, 513.5, 509; 239/76; 251/223, 297

[56] References Cited

U.S. PATENT DOCUMENTS

| | | | |
|---|---|---|---|
| 963,215 | 7/1910 | Eggleston | 251/297 X |
| 1,335,537 | 3/1920 | Swartz | 251/297 |
| 3,831,845 | 8/1974 | Pacht | 239/76 |
| 3,834,621 | 9/1974 | Pacht et al. | 239/76 |
| 4,075,928 | 2/1978 | Bitonti | 137/110 X |
| 4,349,154 | 9/1982 | Pacht . | |
| 4,432,386 | 2/1984 | Pacht . | |
| 4,551,077 | 11/1985 | Pacht . | |
| 4,620,562 | 11/1986 | Pacht . | |
| 4,858,828 | 8/1989 | Stachowiak | 239/76 |
| 5,060,862 | 10/1991 | Pacht . | |
| 5,171,136 | 12/1992 | Pacht . | |

*Primary Examiner*—Robert G. Nilson
*Attorney, Agent, or Firm*—Browning, Bushman, Anderson & Brookhart

[57] ABSTRACT

A flow control valve is provided of the type useful for positioning in a fluid system between a high pressure pump and a fluid gun. The valve preferably includes a body having first and second flow paths therein, and first and second valve members for controlling the fluid flow through the respective flow paths. The first valve member is biased towards engagement with the first seat, and the second valve member serves to substantially restrict fluid flow through the second flow path to maintain a high pressure level upstream from the valve when the gun is deactivated. The second valve seat member may be easily replaced through an access port provided in the body, and adjustment of the second valve member to control the restricted orifice in the second fluid path is obtained with a rachet mechanism. According to the method of the present invention, the gun is activated to increase pressure downstream from the valve and thereby move the first valve member to an open position, and deactivation of the gun closes the first valve member and causes a small quantity of low pressure fluid to flow to the gun, while the desired high pressure upstream from the valve is maintained.

10 Claims, 2 Drawing Sheets

CONSTANT PRESSURE VALVE AND METHOD

This is a division, of application Ser. No. 08/047,962, filed Apr. 15, 1993, now U.S. Pat. No. 5,398,715.

FIELD OF THE INVENTION

The present invention relates to technology designed to control the pressure level within a high pressure fluid system and, more particularly, relates to a valve useful for maintaining a substantial constant pressure within the fluid system upstream from the valve. The valve may be placed within a fluid system including a high pressure fluid pump and a fluid gun, and the valve may be adjusted with a rachet mechanism for easily regulating the desired constant fluid pressure level.

BACKGROUND OF THE INVENTION

Control valves which regulate fluid flow within a high pressure system powering one or more fluid guns are of two basic types. A dump valve, when placed between a high pressure fluid pump and the fluid gun, dumps fluid to the atmosphere when the gun is not activated. The pump sees no substantial load when the gun is deactivated, since gun deactivation automatically causes the dump valve to open to atmosphere. In such a system, the pump thus only acts against a high head pressure when the gun is activated and the dump valve is closed to atmosphere. One disadvantage of a .dump valve within such a system is that one deactivated gun (and thus one dump valve open to atmosphere) lowers pressure to all guns within the fluid powered system. If any one gun operator for a large cleaning operation thus deactivates his gun, other gun operators powered by the same fluid system are essentially rendered inactive. Since the dump valve is typically placed at the site of each gun, dumping of fluid to atmosphere can also create a nuisance, safety, and clean-up problem for the operator.

Shuttle valves used in such a high pressure system overcome the problems inherent in a dump valve, and accordingly are increasingly used in high pressure systems powering multiple fluid guns. The shuttle valve relieves back pressure on the pump in order to maintain reliable operation of a positive displacement pump, yet prohibits substantial fluid flow to the deactivated gun. When the shuttle valve is opened, all of the available fluid pressure from the pump is thus available to maximize the high pressure capability of the fluid gun. The valve may be automatically activated to prohibit substantial fluid flow to the gun (which occurs when releasing the gun trigger), and a relatively small amount of low pressure fluid then continues to pass to the gun. A desired high pressure above a selected level is thus maintained in the system upstream from the valve. Accordingly, the fluid system is maintained under relatively high fluid pressure levels at all times, so that one gun can be deactivated without affecting the operation of other guns within the same system. A small quantity of fluid is released from the system when the valve is activated to be primarily but not completely closed, and accordingly nuisance, safety, and clean-up problems are also minimized.

The positive displacement pump in a shuttle valve fluid system is thus continually subject to substantially the same back pressure or load, whether one or more of the guns within the system are activated or deactivated. Shuttle valves as described above are preferably adjustable, so that the desired minimum system pressure level can be easily obtained.

One version of a constant pressure valve or shuttle valve as described above is disclosed in U.S. Pat. No. 3,831,845 ('845 Patent). The valve disclosed in this patent maintains a desired high pressure level in a fluid system, so that each of a plurality of fluid guns may be deactivated without affecting the performance of the remaining fluid guns. The release of any one gun trigger thus incompletely closes the constant pressure valve associated with that gun, and fluid passing through the valve is then diverted through a small orifice in the shuttle valve. Since fluid passes through an orifice within the gun when the gun is activated, but at the same time fluid substantially by-passes the shuttle valve orifice, the pressure in the system remains substantially the same or drops only slightly when any one gun is deactivated. According to the '845 Patent, the desired high pressure level is preferably adjustable. Such adjustment may be achieved at the hose end of the valve, although this type of system pressure adjustment is difficult and time consuming for the fluid gun operator. Also, a fairly large wrench is typically required to loosen and re-tighten the components which achieve pressure adjustment.

Improved techniques and apparatus are desired by fluid gun operators so that higher pressure levels and thus more effective cleaning and/or cutting operations are possible. Improved techniques and apparatus are also desired to facilitate easy adjustment of the high pressure level within a system as described above, although the cost of the constant pressure valve should be minimized. The useful life of a constant pressure valve used in conjunction with a fluid gun ideally should be increased, and erosion problems associated with high maintenance and repair costs desirably should be reduced.

The disadvantages of the prior art are overcome by the present invention, and improved techniques are hereinafter disclosed for controlling the pressure level within a high pressure fluid system. The methods and apparatus of the present invention are particularly well suited for obtaining a minimum desired high pressure level in a fluid system including a plurality of fluid guns, with a constant pressure valve associated with each fluid gun. One or more guns in the system may accordingly be deactivated without affecting the performance of the remaining guns. The repair and service costs for the valve of the present invention are reduced, thereby also reducing operator downtime.

SUMMARY OF THE INVENTION

In a suitable application, the constant pressure valve of the present invention is provided within a high pressure fluid system between a positive displacement pump and a fluid gun. The constant pressure valve includes a first valve member positioned within a first or primary flow line within the valve body extending between the valve body inlet and the valve body outlet, and a second valve member within a second flow line within the valve body, with this second flow line being hydraulically in parallel with the first flow line. The first valve member is spring biased to a fully .closed position, and moves to a fully open position in response to a pressure increase downstream from the constant pressure valve attributable to activation of the fluid gun. The second valve member is preferably adjustable to vary the effective flow area through a restricted aperture.

When the fluid gun is deactivated, the first valve member is biased closed, and the second valve member acts to maintain a high pressure within the system upstream from the valve while passing a small quantity of low pressure fluid to the deactivated gun. When any gun is activated, the first valve member within the associated constant pressure valve opens to supply fluid pressure to the activated gun. The separation of functions provided by the first and second valve members enhances quality control, and the combination of first and second valve members significantly decreases the downtime for repairing constant pressure valves. By providing a first opened or closed valve and a second valve adjustable to regulate upstream pressure when the gun is deactivated, the sensitivity of the second valve adjustment mechanism is reduced, thereby permitting the use of a less costly yet highly controllable adjustment mechanism for obtaining the desired system fluid pressure level upstream of the valve.

The seat associated with the second valve member, which experience erosion when the fluid gun is deactivated, may be easily replaced through a side port spaced from both the fluid inlet and the fluid outlet in the valve body. The adjustment mechanism for selectively controlling the second valve member preferably includes a rachet mechanism, which may be the same mechanism used for controlling a flow control valve, so that manufacturing and service costs may be effectively reduced.

It is an object of the present invention to provide a high pressure valve that may be placed between a pump and a discharge source, such as a fluid gun, with the valve functioning to pass a small quantity of low pressure fluid to the fluid gun and simultaneously maintain a high constant pressure within the system upstream from the valve when the gun is deactivated, and further functioning to pass substantially unrestricted fluid flow to the fluid gun when the gun is activated for a high pressure cleaning or cutting operation.

Yet another object of this invention is to increase the useful life and reduce service and repair cost for a constant pressure valve of the type which causes the pump to be subject to substantially the same high pressure load regardless of whether the downstream discharge source is activated or deactivated.

Still another object of this invention is a constant pressure valve which includes a first valve member for controlling opening and closing of the valve, and an adjustable second valve member for controlling the desired fluid pressure within the system upstream from the valve when the gun is deactivated.

A feature of this invention is that the seat which cooperates with the valve member for adjusting the constant pressure level upstream from the valve may be easily removed, repaired or replaced, then reinserted through an access port in the valve body.

It is another feature of the this invention that the constant pressure valve is adjustable with a rachet mechanism which may also be used with a flow control valve, thereby reducing manufacturing and service costs.

It is an advantage of the present invention that the constant pressure valve may be adjustable without altering the flow lines or connections to or from the valve.

These and further objects, features, and advantages of the present invention should be apparent from the following detailed description, wherein reference is made to the figures in the accompanying drawings.

DETAILED DESCRIPTION OF PREFERRED EMBODIMENTS

Figure 1:
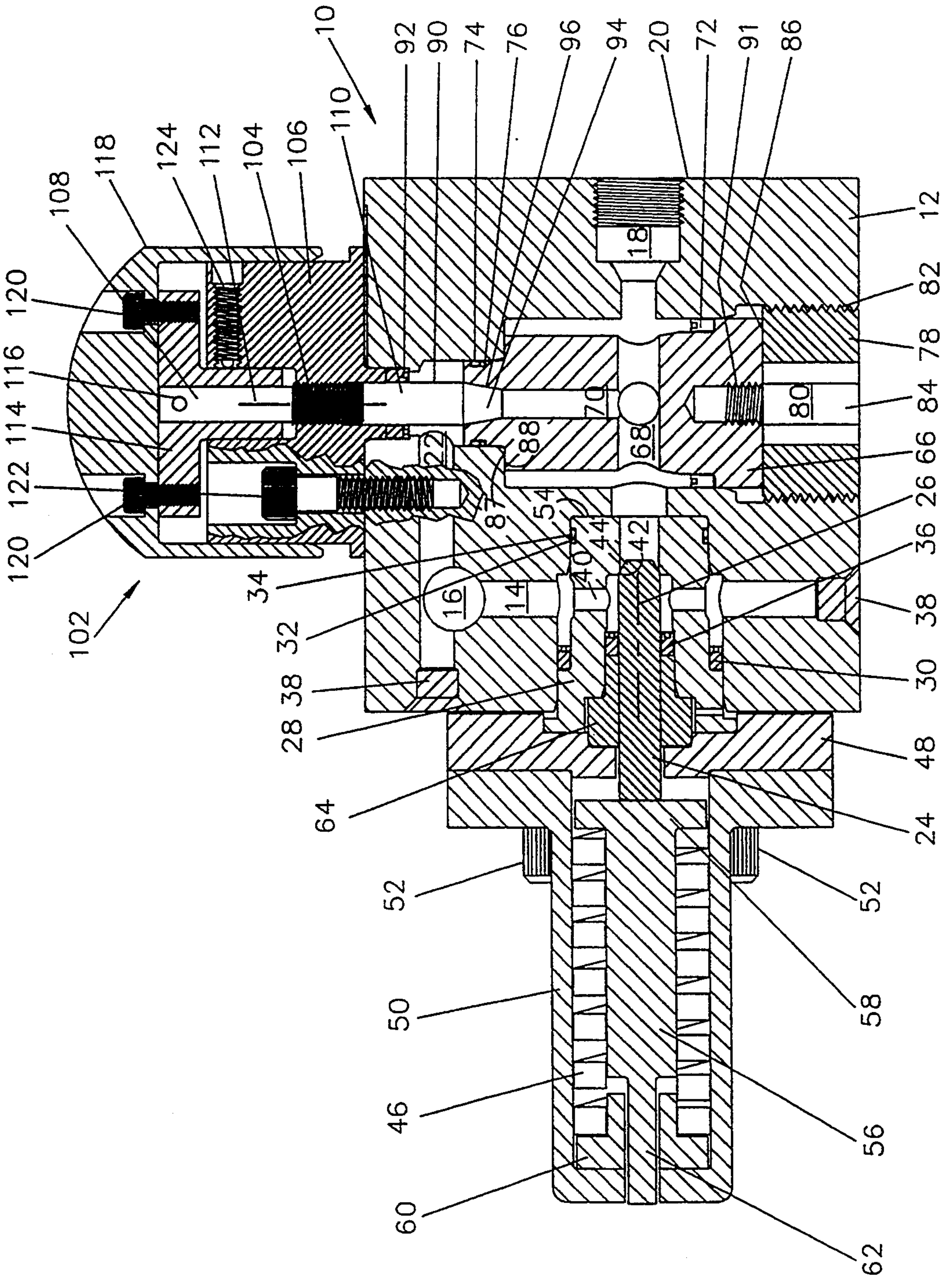
FIG. 1 is a cross-sectional view of a suitable constant pressure valve according to the present invention.

FIG. 1 depicts a constant pressure valve 10 according to the present invention. In a typical application, the valve 10 is installed in a fluid line extending between a positive displacement pump and a fluid gun. The valve 10 cooperates with the fluid gun to supply high pressure fluid to the gun nozzle when the gun is activated, and passes fluid at low pressure to a deactivated gun. This desirably results in the fluid line upstream from the gun being highly pressurized when the gun is deactivated, so that multiple guns can be supplied with high pressure fluid from a single fluid system powered by a pump. The valve 10 as shown in the single figure may thus replace the pressure control apparatus 12*a* and 12*b* depicted in the single figure of U.S. Pat. No. 3,831,845 hereby incorporated by reference, wherein the fluid system includes a pump and a plurality of fluid guns.

The valve 10 comprises a valve body 12 having a primary or first flow path 14 therein extending between fluid inlet port 16 and fluid outlet port 18. Each of the ports 16, 18 are conventionally threaded for mating engagement with the end of a high pressure hose fitting. Those skilled in the art will thus understand that port 16 is provided through a fluid inlet face of the valve body 12 which is perpendicular to fluid outlet face 20 on the valve body. Valve body 12 desirably may be formed from a substantially rectilinear block of steel, although other configurations are within the scope of this invention.

The valve body 12 also includes a second flow path 22, which is a pressure controllable flow path as described subsequently. Flow path 22 also provides fluid communication between inlet port 16 and outlet port 18, and accordingly at ]east a portion of flow path 22 is hydraulically in parallel with flow path 14.

The first valve member 24 is provided within the valve body 12, and moves along axis 26 to control fluid flow through flow path 14. A valve guide retainer 28 is fixedly positioned within the body 12, and seal 30, O-ring seal 32, and backup ring 34 provide fluid tight communication between the body and retainer 28 to prevent fluid leaking from flow path 14. Seal 38 similarly provides .a fluid tight seal between retainer 28 and the first valve member 24. Conventional plugs 38 close off the ends of drilled passageways within the valve body.

Retainer 28 includes a generally sleeve-shaped body, and a plurality of ports 40 through the side walls of the retainer body provide fluid communication along the flow path 14. The retainer 28 also defines a seat 42 for sealing engagement with the first valve member 24. Valve 24 is thus depicted in the single figure in its closed position for blocking fluid flow through the first flow path, since the sealing surface end 44 of the valve member 24 is in engagement with the seat 42. As explained subsequently, however, it should be understood that the build-up of pressure within the fluid outlet port 18, caused by pulling on the trigger to activate the fluid gun, increases the pressure in port 18 and thus the fluid pressure acting on the valve member 24, causing the valve member to move to the left in the single figure and compressing spring 46. When valve member 24 is in its closed position as shown in the Figure, the fluid gun is deactivated, and the only flow between the inlet port 16 and the outlet port 18 is through the second passageway 22. When the gun is activated, however, valve member 24 is moved off seat 42, and a substantially large quantity of high pressure fluid flows through the flow path 14 and past the valve member 24. Valve bushing 64 is provided between the valve member 24 and valve bushing retainer 48, and a cylindrical aperture within the valve bushing 28 insures that movement of the valve member 24 is limited to movement along the axis 26.

Valve bushing retainer 48 and spring housing 50 are each secured by conventional bolts 52 to the body 12, as shown. Valve bushing retainer 48 thus presses against the valve guide retainer 28 to position end surface 54 of retainer 28 in engagement with an abutment surface in body 12. A spring guide 56 having a head 58 is provided within the spring housing 50, and head 58 contacts valve member 24 and thus moves along axis 26 with the valve member. Impact ring 60 is provided for reducing damage to the depicted components when the valve member 24 is moved to the open position. Movement of the valve member 24 along axis 26 toward an open position causes projection indicator 62 at the end of spring guide 56 to move out of the spring housing 50, thereby providing a reliable indication of the position of the valve member 24 within the body 12.

A valve seat member 66 is provided within the body 12, and includes a through port 68 which serves as a continuation of the first flow path 22, and a right angle pathway 70 similarly serving as a continuation of the second flow path 22. Seal 72, O-ring seal 74, and backup ring 76 provide fluid tight communication between the valve seat member 66 and the body 12 to prevent leakage from the first and second flow paths. Valve seat retainer 78 is positioned within the access port 80 within the body 12, and is threaded to the body with mating threads 82. Inserting an Alien wrench into cavity 84 in the retainer 78 allows a service technician to easily unthread the valve seat retainer 78, remove and replace the valve seat member 66, then install the new valve seat. Valve seat retainer 78 includes an end surface 86 which abuts seat member 66 and secures the seat member 66 within the valve body by engagement of shoulder 87 on the seat member and stop surface 88 formed on the valve body 12. A threaded port 91 may be provided in the seat member 66 so that a bolt (not shown) can be threaded into engagement with port 91 to facilitate removal of seat member 66 from valve body 12.

A second or pressure controllable valve member 90 is positioned within the body 12 and substantially restricts fluid flow from the inlet port 16 to the outlet port 18 via the second passageway 22. The second valve member 90 is sealed with the body 12 by seal 92, and frustroconical end surface 94 on the valve member is provided for cooperation with seating surface 96 provided on the valve seat member 66. During normal operation of the valve 10, surfaces 94 and 96 are not in sealing engagement, but rather are spaced a slight distance apart so that a small orifice is effectively formed within the second fluid passageway 22. Accordingly, fluid flow between the inlet port 16 and the outlet port 18 along the second flow path 22 is substantially restricted. The surface 96 technically may not be a seat since the end surface 94 does not normally seal with surface 96. For convenience, however, surface 96 is described as a seating surface since its preferred construction is similar to that of a seating surface.

First valve member 24 is closed in response to the fluid gun being deactivated, and at that time no fluid flows through the passageway 14, but rather flows through the pressure controlled passageway 22. The fluid pressure level upstream from the valve 10 and the amount of fluid which flows through the restricted passageway 22 to the gun is thus determined by the selected spacing between the surfaces 94 and 96. When the gun is deactivated, fluid at a low pressure flows through the valve 10 to the gun, and a desired high pressure level is obtained in the system upstream from the valve 10. When the gun is activated, flow through the orifice within the gun creates increased pressure in the port 18, as explained previously, which causes the first valve member 24 to compress the spring 46 and move off the seat 42. When the gun is activated, fluid pressure both upstream and downstream from the gun is thus high. When the fluid gun is activated, substantially all fluid, e.g., in excess of 80%, flows between the inlet 16 and the outlet 18 through the passageway 14, and only a small quantity of fluid flows through the restricted passageway 22.

It is a particular feature of the invention that the position of the second valve member 90 with respect to the valve seat member 66 is adjustable, so that the amount of fluid flowing to a deactivated gun and the pressure upstream from the valve when the gun is deactivated may be regulated. According to a preferred technique, a flow control assembly 102 is provided for this purpose. Flow control assembly 102 includes the second valve member 90 as discussed above, with member 90 being threaded at 104 to the flow control housing 106. Rotation of the member 90 thus raises or lowers the frustroconical surface 94 with respect to the seating surface 96 to effectively control the size of the restricted orifice through the second passageway 22. The upper portion 108 of the second valve member 90 has a diameter slightly less than the lower portion 110, and accordingly valve member 90 can only be backed out so far before the larger diameter cylindrical portion 110 engages the threads 104 on the housing 106, thereby prohibiting further rotation. Rotation of valve member 90 about axis 112, which moves the valve member along the axis 112, is caused by the corresponding rotation of valve guide locator 114, which is secured to the valve member by pin 116. Locator 114 in turn is rotated by end cap 118, with conventional bolts 120 providing connection between the end cap 118 and the locator 114. A plurality of bolts 122 similarly provide a mechanical connection between the control housing 106 and the valve body 12.

The assembly 102 also includes a plunger spring 124 forming part of a rachet mechanism for controlling the axial position of the second valve member 90 with respect to the valve seat member 66. A plurality of fixed rotatable positions of the end cap 118 with respect to the housing 106 are thus provided, such that when the first valve member 24 is closed, fluid flow through the second passageway 22 and thus the pressure upstream from the valve 10 may be easily adjusted. Other details with respect to the assembly 102 are disclosed in pending application Ser. No. 07/932,634, filed on Aug. 20, 1992, and entitled "FLUID FLOW CONTROL VALVE," now U.S. Pat. No. 5,244,182. Since the assembly 102 may be the same rachet mechanism which is used in a fluid flow control valve as disclosed in the pending application referenced above, manufacturing and service costs may be reduced.

By providing the combination of first and second valve members as discussed above, repair costs for the valve 10 are substantially minimized compared to a constant pressure valve with a single valve member. The first valve member 24 will normally be in either the fully opened or the fully closed position, and this valve member 24 is able to withstand the large shock associated with opening and closing of the first flow path by the valve member 24. Since the first valve member 24 is not a throttling valve, erosion on the valve member 24 is minimal, and accordingly maintenance on valve member 24 is also minimal. By providing the above combination of first and second valve members, the adjustment of the second valve member to selectively control fluid pressure upstream of the valve is less critical than for a constant pressure valve with a single valve member. Accordingly, lower costs are associated with providing a reliable adjustment mechanism for controlling the position of the second valve member, and the overall costs of the valve may thus be reduced without adversely affecting the reliable adjustment of the valve.

The second valve member 90 provides the desired function of substantially restricting the flow through the valve and, due to the nature of that throttling operation, the seat member 66 experiences erosion. As explained above, however, the seat member 66 may be easily and inexpensively replaced, and in most cases would be replaced without repairing or replacing the first valve member 24. Also, adjustment of the second valve member 90 as explained above for changing the restricted flow area through the flow path 22 is accomplished without affecting the operation of the fully opened or fully closed first valve member 24.

It should be understood that the access port 80 in the body 12 is preferably spaced from both the inlet port 16 and the outlet port 18, and in fact may be provided on a different face of the body 12 from both the fluid inlet face and the fluid outlet face 20. This spacing between the access port 80 and the inlet and outlet ports 16, 18, respectively, thus insures that the flow lines which are connected to the valve 10 need not be loosened or disconnected in order to adjust the valve member 90 as explained above, or to repair or replace the valve seat member 66. The valve member 24 moves along an axis 26 to open and close the primary flow path 14, and axis 26 preferably is perpendicular to axis 112, which controls the direction of adjustable movement of the second valve member 90 with respect to the second seat member 66.

According to the method of the present invention, an improved technique is provided for controlling pressure upstream from a valve positioned in a fluid system between a high pressure pump and a fluid discharge source, such as a fluid gun. According to the method, the first flow path is provided within the valve body extending between the fluid inlet port and the fluid outlet port, and a second flow path is provided in the same valve body hydraulically in parallel with at least a portion of the first flow path. A seat is provided within the valve body along the first flow path, the valve member being movably positioned within the first flow path and biased toward engagement with the first seat. The gun may be activated to automatically increase .pressure downstream from the valve and thereby move the first valve member to an open position, such that when the first valve member is open, substantially all fluid flow through the valve passes through the first flow path. A second valve member is positioned within the second flow path within the valve body, and substantially restricts fluid flow through the second flow path, such that when the first valve member is closed, fluid by- passes the second valve member to the output port of the valve and then to the gun, thereby maintaining a high pressure level upstream from the valve. A second seat member is preferably positioned within the valve body for cooperation with the second valve member in order to substantially restrict fluid flow through the second flow path, and an access port within the valve body spaced from both the fluid inlet port and the fluid outlet port is provided for removal and insertion of the second seat member. A stop surface on the access port plug positions the second seat member at a substantially fixed location within the valve body, and a frustroconical end surface of the second valve member is preferably spaced a selected distance from the second seat member for controlling fluid flow past the second valve member. The position of the second valve member may be selectively controlled with respect to the second seat member with a rachet mechanism, thereby controlling the pressure level upstream from the valve when the first valve member is closed.

Figure 2:
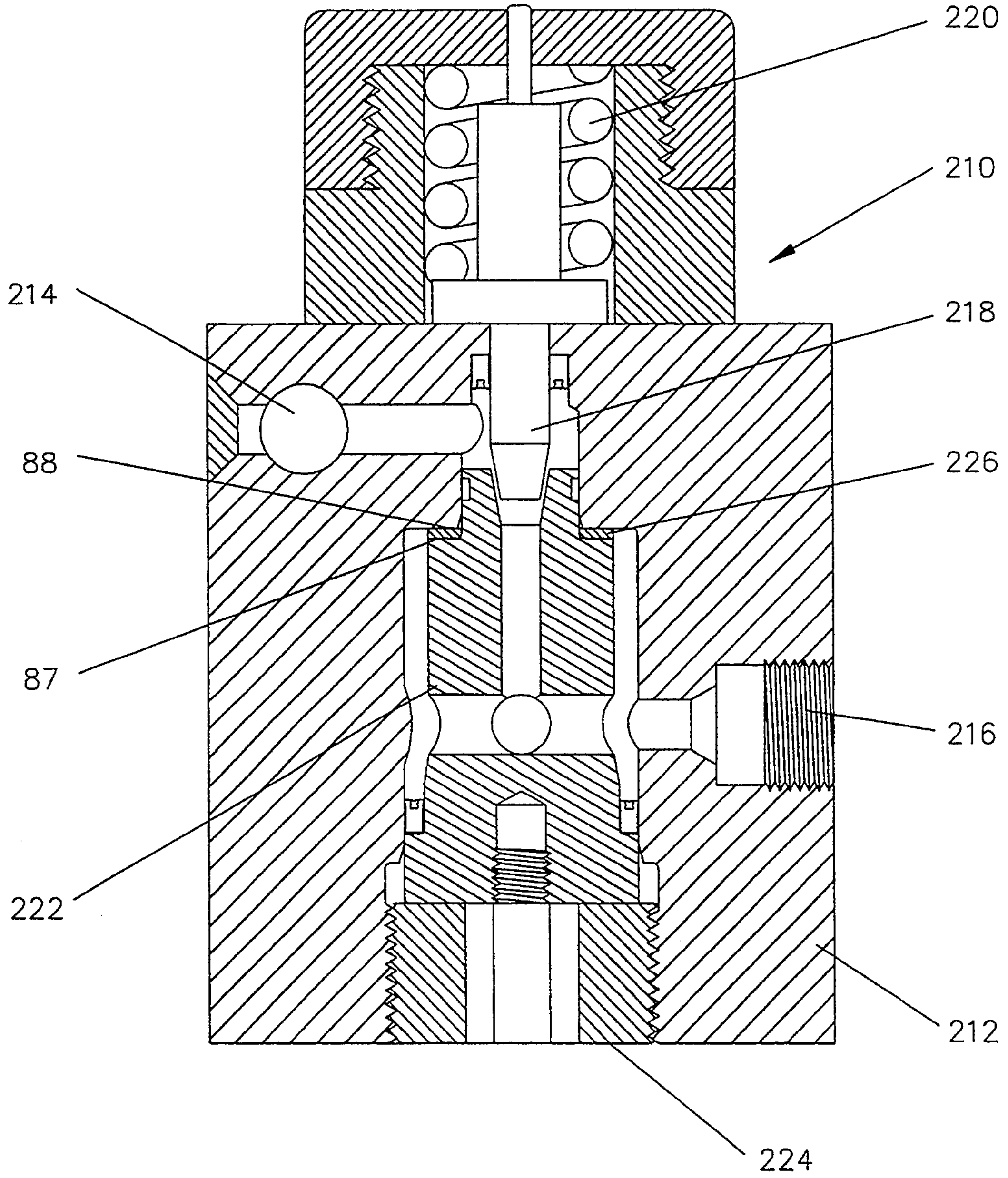
FIG. 2 is a cross-sectional view of another embodiment of a constant pressure valve according to the present invention.

In another embodiment as shown in FIG. 2, the constant pressure control valve 210 of this invention may have a single flow path through the valve body 212 for fluid communication between the fluid inlet port 214 and the fluid outlet port 216. A valve member 218 is movable within this flow path, and is spring 220 biased towards a closed position in a manner similar to the valve member disclosed in the '845 Patent, so that gun activation overcomes the biasing force of the spring to open the valve. When the gun is deactivated, the spacing between the valve member and a seat 222 within the valve body define the flow area of the orifice which substantially restricts fluid flow through the flow path. As with the valve member of the '845 Patent, deactivation of the gun thus causes the valve member to move from a fully open position to a substantially closed position, and the valve member and seat then cooperate for substantially restricting fluid flow to create a desired pressure upstream from the valve. To achieve adjustment of the upstream pressure, the effective orifice size can be changed by controlling the position of the seat with respect to the valve member, and this adjustment may be accomplished by either providing adjustment of the seat with respect to the valve body, or by providing adjustment of the valve member with respect to the valve body. For this embodiment, and unlike the apparatus of the '845 Patent, an access port is provided within the valve body spaced from both the fluid inlet port and the fluid outlet port, so that the seat may be easily removed and reinserted into the valve body. A removable plug 224 similar to that member discussed above is provided for normally blocking the access port. Accordingly, the fluid lines to the valve need not be disconnected to repair or place the seat, which experiences erosion when the gun is deactivated. When the high pressure system is deactivated, the plug member may be unthreaded and the seat removed through the access port, the new seat installed, and the plug reinserted.

If desired, a rachet mechanism as described above may still be used in this second embodiment for controlling the axial position of the valve member with respect to the seat, with a spring or other biasing member placed between the rachet mechanism and the valve member to allow movement of the valve member in response to activation of the gun. Alternatively, adjustment of the seat with respect to the valve body may be accomplished by various techniques. In the embodiment depicted in FIG. 2, a washer 226 of a selected thickness may be placed between the shoulder 87 on the seat member and stop surface 88 on the valve body, thereby effectively adjusting the position of the seat with respect to the valve member. Adjustment of the valve member is normally preferred, however, since the torque required to obtain adjustment is a function of the cross-sectional area of the component rotated to achieve adjustment at the location of its interconnection with the body 12 (or body 106 secured to body 12). As evidenced in FIG. 1, the diameter of threads 104 is significantly less than the diameter of threads 82, and accordingly less torque is required for the depicted embodiment to adjust the valve member with respect to the body, compared to the torque that would be required to adjust the seat member 66 relative to the body.

The overall design of the valve 10 according to the present invention thus achieves the purposes set forth above. Those skilled in the art will understand that various modifications may be made to the embodiment shown in the figure without departing from the spirit or scope of the invention. The foregoing disclosure and description of the invention are thus illustrative, and changes in both the method and apparatus for controlling fluid pressure in a system as described above may be made without departing from the present invention.

What is claimed is:

1. A flow control valve for positioning in a high pressure fluid system upstream of a high pressure discharge source, the valve comprising:

a valve body having a pressure controllable first flow path therein extending between a fluid inlet port and a fluid output port and a second flow path therein hydraulically in parallel with the first flow path;

a first pressure controllable valve member movable within the valve body for controlling fluid flow through the pressure controllable flow path;

a second valve member movable within the valve body from a closed position to an opened position;

a seat within the valve body for cooperation with the second valve member for substantially restricting fluid flow through the seat with respect to the second flow path;

an adjustment mechanism for selectively controlling the position of the seat with respect to the second valve member and thereby controlling the pressure level upstream from the valve;

an access port within the valve body spaced from both the fluid inlet port and the fluid outlet port for removal and insertion of the seat within the valve body, the access port positioned opposite the valve member with respect to the seat; and a removable plug member for blocking the access port.

2. The flow control valve as defined in claim 1, wherein the seat has a stop surface for positioning the seat at a substantially fixed location within the valve body.

3. The flow control valve as defined in claim 1, further comprising:

the second valve member having a frustoconical end surface spaced a selected distance from the seat for controlling flow past the second valve member.

4. The flow control valve as defined in claim 1, wherein the adjustment mechanism comprises:

a rachet mechanism for controlling the axial position of the second valve member and providing a plurality of fixed rotatable positions such that fluid flow from the inlet port to the outlet port can be adjusted.

5. The flow control valve as defined in claim 1, further comprising:

an indicator movable in response to movement of the first valve member within the valve body for providing an indication of the position of the first valve member within the valve body.

6. The flow control valve as defined in claim 1, further comprising:

the first valve member being movable along first axis; and the second valve member being axially adjustable along a second axis substantially perpendicular to the first axis.

7. The flow control valve as defined in claim 1, further comprising:

a first seal for sealing engagement between the first valve member and the valve body.

8. The flow control valve as defined in claim 1, further comprising:

the first valve member having a first end with an enlarged diameter for sealing engagement with the valve body, and an opposing second end having a reduced diameter less than the enlarged diameter, such as the first valve member may be removed from the valve body without disassembling the first valve member.

9. The flow control valve as defined in claim 1, wherein the removable plug member has a plug member stop surface for engagement with the seat.

10. The flow control valve as defined in claim 1, further comprising:

a spring for biasing the first valve member closed.

* * * * *